(12) United States Patent
Hubert

(10) Patent No.: US 6,588,707 B1
(45) Date of Patent: Jul. 8, 2003

(54) DEVICE FOR SUSPENDING A PAYLOAD IN A LAUNCH VEHICLE

(75) Inventor: Pascal Hubert, Perignat les Sarlieve (FR)

(73) Assignee: Centre National d'Etudes Spatiales, Paris Cedex (FR)

( * ) Notice: Subject to any disclaimer, the term of this patent is extended or adjusted under 35 U.S.C. 154(b) by 0 days.

(21) Appl. No.: 09/868,641

(22) PCT Filed: Dec. 28, 1999

(86) PCT No.: PCT/FR99/03302

§ 371 (c)(1),
(2), (4) Date: Sep. 25, 2001

(87) PCT Pub. No.: WO00/38987

PCT Pub. Date: Jul. 6, 2000

(30) Foreign Application Priority Data

Dec. 29, 1998 (FR) .............................................. 98 16561

(51) Int. Cl.[7] .................................................. B64G 1/64
(52) U.S. Cl. .................................. 244/158 R; 244/161
(58) Field of Search ............................ 244/158 R, 161; 267/122, 123, 140.14

(56) References Cited

U.S. PATENT DOCUMENTS

| | | | | |
|---|---|---|---|---|
| 2,614,896 A | * | 10/1952 | Pierce, Jr. ................... | 188/268 |
| 4,536,114 A | | 8/1985 | Belew ......................... | 410/156 |
| 4,776,539 A | * | 10/1988 | Byers et al. ............. | 244/158 R |
| 5,226,616 A | | 7/1993 | Butkiewicz ............. | 244/158 R |
| 5,655,757 A | * | 8/1997 | Starkovich et al. ......... | 188/267 |
| 6,244,541 B1 | * | 6/2001 | Hubert ..................... | 244/158 R |
| 6,345,788 B1 | * | 2/2002 | Shtarkman .............. | 244/158 R |
| 6,357,699 B1 | * | 3/2002 | Edberg et al. .............. | 102/377 |

FOREIGN PATENT DOCUMENTS

| | | | | |
|---|---|---|---|---|
| EP | 0 727 351 | | 8/1996 | |
| WO | 98/32658 | | 7/1998 | |
| WO | WO-98/32658 | * | 7/1998 | ............ B64G/1/64 |

* cited by examiner

Primary Examiner—Peter M. Poon
Assistant Examiner—Timothy D. Collins
(74) Attorney, Agent, or Firm—Jacobson Holman PLLC

(57) ABSTRACT

The invention concerns a device comprising elastic stress-absorbing means for installed between first (10) and second (11) rigid annular members centered on the launch vehicle longitudinal axis and integral with the launch vehicle (1) and the payload (4) respectively, and device for controlling the elastic stress-absorbing devices capable of adapting the device rigidity to the different phases of the launching vehicle flight. The invention is characterized in that the control device comprise at least a plurality of hydraulic stops (13*j*) each arranged between the first (10) and second (11) rigid annular members, the stops (13*j*) being mobile at least between a first position wherein the rigidly link the annular members (10, 11) and a second position wherein the elastic stress-absorbing devices are activated.

18 Claims, 2 Drawing Sheets

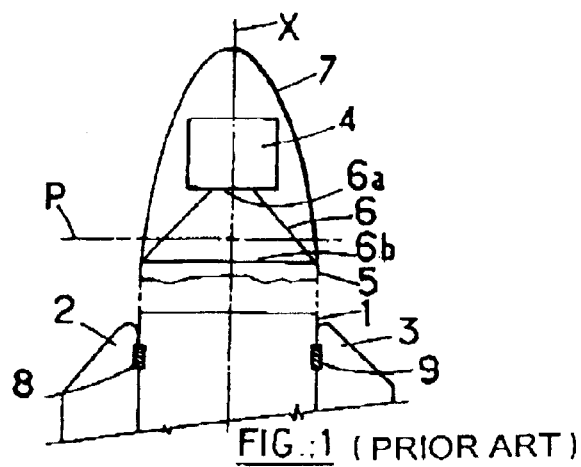
FIG.:1 (PRIOR ART)
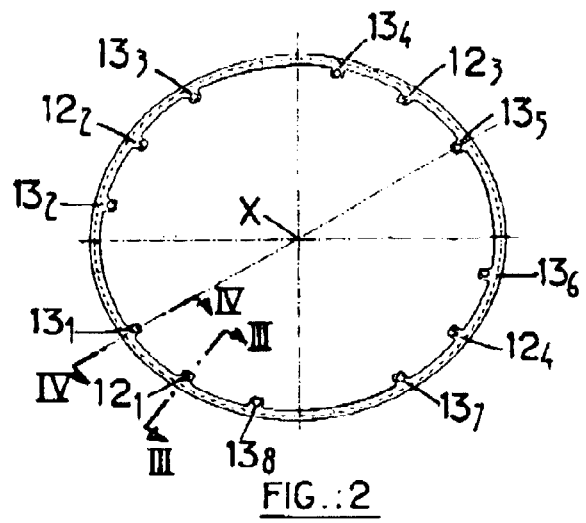
FIG.:2
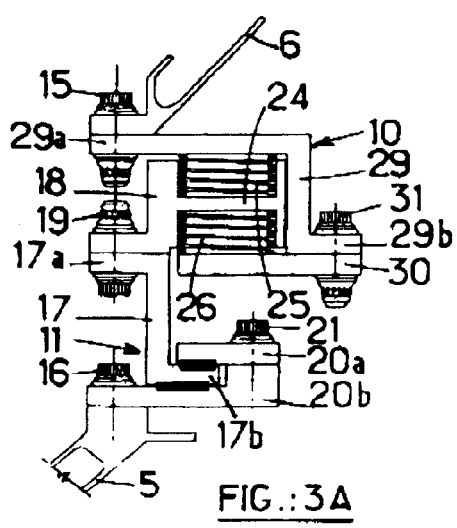
FIG.:3A
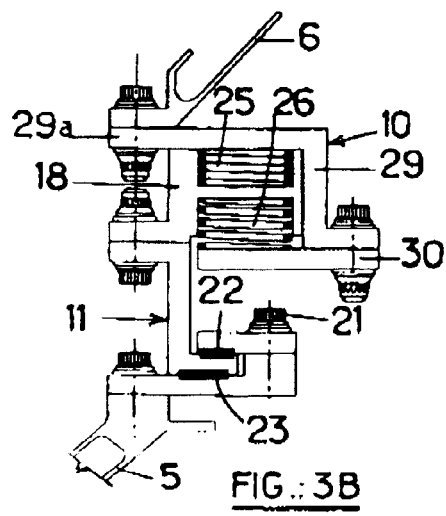
FIG.:3B

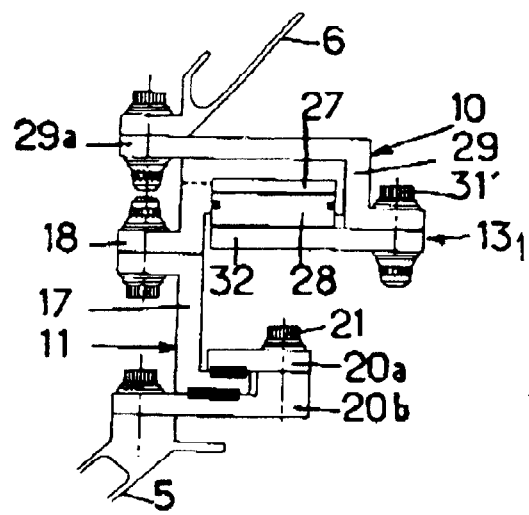
FIG.: 4
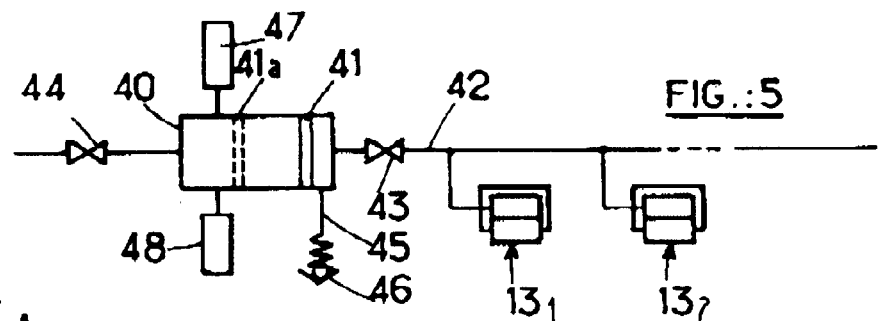
FIG.: 5
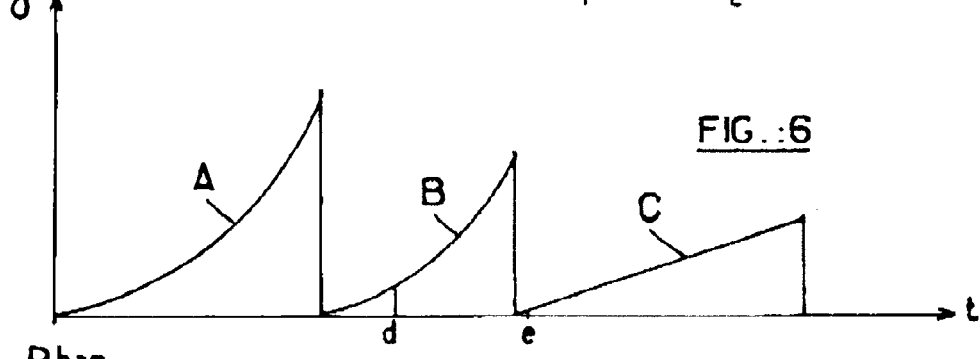
FIG.: 6
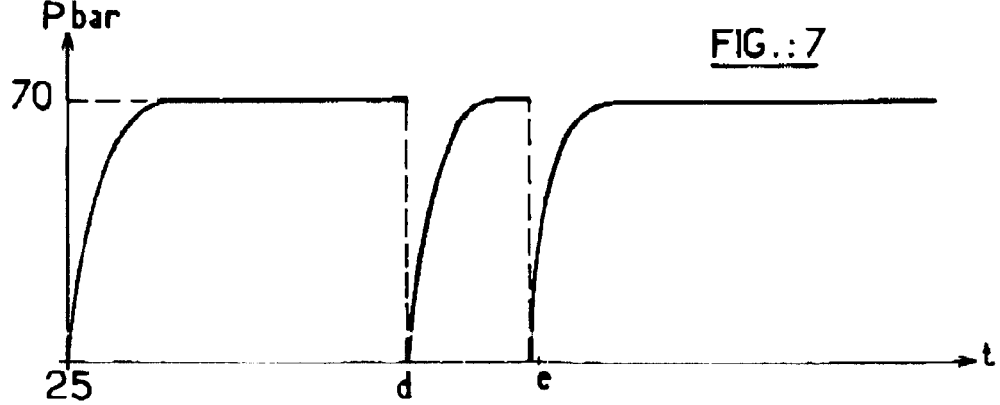
FIG.: 7

DEVICE FOR SUSPENDING A PAYLOAD IN A LAUNCH VEHICLE

BACKGROUND OF THE INVENTION

1. Field of the Invention

The present invention relates to a device for suspending a payload in a launch vehicle for launching said payload into space and more particularly to a device that includes a force-absorbing system installed between first and second rigid annular members concentric with the longitudinal axis of the launch vehicle and respectively fastened to said launch vehicle and said payload and a control system for said force-absorbing system adapted to modify the stiffness of the suspension device in various phases of the flight of the launch vehicle.

2. Description of the Related Art

This kind of device is disclosed in International patent application WO 98/32658 filed by the applicant and is designed to be integrated into a launch vehicle for launching a payload into space shown diagrammatically in FIG. 1 of the accompanying drawings, in which the launch vehicle has a first stage 1 equipped with boosters 2 and 3 parallel to the longitudinal axis X of the stage and fixed to the shell of the first stage in diametrally opposite positions. FIG. 1 also shows diagrammatically a payload such as a satellite 4 mounted on a second stage 5 of the launch vehicle by means of an adapter in the form of a frustoconical skirt 6. The satellite is conventionally protected by a nose-cap 7 while it is passing through the atmosphere.

As explained in the aforementioned patent application, the thrust developed by the boosters 2, 3 applies very high forces to the shell of the first stage, in particular at the points 8, 9 where the boosters 2, 3 are attached to the first stage.

The forces are much higher at these attachment points, and if they were transmitted to the skirt 6 they would deform it asymmetrically, which could damage the satellite if countermeasures were not applied. According to the aforementioned patent application, the countermeasures consist of installing a suspension device which takes the form of an annular chamber with flexible walls arid filled with a fluid between the satellite and the launch vehicle, for example at the level of the larger base 6b of the skirt 6, whose other base 6a receives the satellite. The "excess" forces exerted on the annular chamber in line with the attachment points 8, 9 are uniformly distributed in the circumferential direction by the fluid in the chamber and the skirt 6 is therefore subjected to perfectly symmetrical forces that do not deform it asymmetrically. This maintains the integrity of the satellite when the boosters 2, 3 are operating.

Means are provided for varying the pressure of the fluid in the annular chamber. The pressure can be reduced from a relatively high value ensuring good mechanical cohesion of the launch vehicle and the skirt 6, which is necessary in particular when the boosters 2, 3 are operating, to a lower value for absorbing and damping forces such as vibration or shock propagating in the launch vehicle, in particular on separation of the stages of the launch vehicle and the nose-cap 7.

The device described in the patent application previously cited achieves the stated objectives. However, it implies the use of either a flexible wall annular chamber or a chamber with two complementary rigid annular walls that are axially mobile relative to each other and sealed by at least one O-ring whose length is equal to the circumference of the chamber.

Because it is integrated into a launch vehicle, this kind of device must be very reliable. Making it very reliable can be very costly because of sealing problems caused by using a flexible wall annular chamber or an annular chamber incorporating an O-ring with the same circumference.

If the flexible wall annular chamber solution is adopted, when the pressure in the chamber is high the flexible wall is greatly stiffened, to the point that forces transmitted by the device pass through the wall, rather than through the fluid it confines, which renders the device ineffective at high pressures.

SUMMARY OF THE INVENTION

An object of the present invention is precisely to provide a device for suspending a payload in a launch vehicle for launching said payload into space which is free of the above drawbacks and which in particular enables the stiffness of the suspension to be varied to adapt it to particular conditions encountered during successive phases of the flight of the launch vehicle, combined with high reliability and moderate production cost.

To be more precise, an object of the invention is to provide this kind of device adapted to have a relatively higher stiffness during ordinary phases of the flight of the launch vehicle, to confer good mechanical cohesion thereon, and a relatively lower stiffness during extraordinary phases of the flight of the launch vehicle, such as those corresponding to separation of the nose-cap or of stages of the launch vehicle, which phases generate shock and/or vibration which must be absorbed or damped before it propagates as far as the satellite.

The above objects of the invention, together with others that will become apparent on reading the following description, are achieved by means of a device for suspending a payload in a launch vehicle for launching said payload into space, the device including elastic force-absorbing means installed between first and second rigid annular members concentric with a longitudinal axis of the launch vehicle and respectively fastened to said payload and said launch vehicle, and control means for controlling said elastic force-absorbing means suitable for adapting the stiffness of the suspension device to various phases of the flight of the launch vehicle, characterized in that said control means include a plurality of hydraulic thrust bearings between said first and second rigid annular members, said thrust bearings being mobile between a first position in which they couple said annular members rigidly and a second position in which said elastic force-absorbing means are activated.

As shown in more detail later, the resulting flexibility of the payload suspension can filter shock occurring during the extraordinary phases of flight mentioned above.

In accordance with the invention, the stiffness of the suspension device is varied by appropriately controlling conventional hydraulic thrust bearings which can be sealed to the level of reliability required by the aerospace industry at moderate cost.

According to other features of the device according to the invention, said elastic force-absorbing means consist of a plurality of spring thrust bearings, said plurality of spring thrust bearings and said plurality of hydraulic thrust bearings being interleaved with each other. The hydraulic thrust bearings are at equal pressures. The control means include a circuit for feeding said hydraulic thrust bearings with liquid and said circuit includes a cylinder for selectively varying the pressure of said liquid between first and second values controlling the placing of the hydraulic thrust bearings in their first and second positions, respectively.

BRIEF DESCRIPTION OF THE DRAWINGS

Other features and advantages of the present invention will become apparent on reading the following description and examining the accompanying drawings, in which:

FIG. 1 is a diagram showing part of a prior art satellite launch vehicle, as described in the preamble to this description, FIG. 2 is a diagrammatic plan view of a device in accordance with the present invention, FIGS. 3A and 3B are views in axial section of a spring thrust bearing forming part of the device shown in FIG. 2, in two different operating states of the thrust bearing, FIG. 4 is a view in axial section of a hydraulic thrust bearing forming part of the device in accordance with the invention, FIG. 5 is a diagram of a control circuit controlling the pressure of the hydraulic liquid in the hydraulic thrust bearings of the device in accordance with the invention, and FIGS. 6 and 7 are graphs used to explain how the device in accordance with the invention works.

DETAILED DESCRIPTION OF THE PREFERRED EMBODIMENTS

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

The device in accordance with the present invention is installed in a plane P perpendicular to the axis X of the launch vehicle (see FIG. 1), this median plane P being at any level between the bases $6a$ and $6b$ of the skirt 6, and advantageously at the level of the base $6b$.

FIG. 2 shows that the device is generally circular. It is essentially made up of first and second annular members stacked in the axial direction and between which are installed a plurality of spring thrust bearings $12_i$ and a plurality of hydraulic thrust bearings $13_j$. It is associated with another mechanical device whose structure and operation constitute the subject matter of a French patent application filed this day by the applicant and whose title in translation is "Device for supporting a payload in a launch vehicle of said payload", Reference may be had to that application for more details of this device, whose function is to prevent transmission to the satellite of the "excess force" referred to in the preamble of this description. Thus, strictly speaking, it is not part of the device in accordance with the invention, whose function is to prevent transmission of shock or vibration to the satellite.

Note that the thrust bearings mentioned above are distributed regularly and interleaved with each other. By way of illustrative and non-limiting example only, the device shown comprises four spring thrust bearings $12_i$ (i from 1 to n=4) and eight hydraulic thrust bearings $13_j$ (j from 1 to n=8) which are equi-angularly distributed.

FIGS. 3A, 3B and 4 are respectively partial views in axial section of the device in accordance with the invention taken along the lines III and IV in FIG. 2 passing through a spring thrust bearing $12_i$ and a hydraulic thrust bearing $13_j$, respectively. It must be understood that the other thrust bearings of the same type are identical to those to be described.

In these figures, the first annular member 10 is fixed to the skirt 6 fastened to the satellite 4 and the second annular member 11 is fixed to the second stage 5 of the launch vehicle by circumferentially distributed nut and bolt fasteners such as those referenced 15 and 16, respectively.

The annular member 11 comprises a first annular flange 17 and a second annular flange 18 fastened together by nut and bolt fasteners such as that referenced 19.

The first flange 17 takes the form of a ring whose axis is parallel to the axis X of the launch vehicle. The ring has two axially spaced radial annular rims. One rim $17a$ projects outward and has nut and bolt fasteners such as that referenced 19 passed through it. The other rim $17b$ is directed inwardly and engaged in an annular groove delimited by rings $20a$, $20b$ assembled by nut and bolt fasteners 21. The ring $20b$ is fixed to the second stage 5 by nut and bolt fasteners such as the nut and bolt fastener 16 mentioned above.

Shoes 22, 23 allow the rim $17b$ of the flange 17 to slide in the groove delimited by the rings $20a$, $20b$ (see FIG. 3B), in the direction transverse to the axis X of the launch vehicle, to provide the decoupling needed to eliminate transmission of "excess" force when the boosters 2, 3 are operating, as explained in detail in the previously cited French patent application filed this day by the applicant and whose title in translation is "Device for supporting a payload in a launch vehicle of said payload", to which reference should be had for more details on this topic.

The second flange 18 is mounted coaxially on the first flange by means of nut and bolt fasteners such as that referenced 19 and takes the form of a ring with bores in both its axially spaced end faces. In line with the spring thrust bearings $12_i$ it has two concentric axial bores isolated by their common bottom 24 (see FIG. 3A) and each bore opens onto one of the two end faces of the ring and receives a respective spring 25, 26, for example a coil spring, operating in compression. The springs 25, 26 therefore act in opposite directions on annular radial surfaces of members 29, 30 described below.

In line with the hydraulic thrust bearings $13_j$ (see FIG. 4), the flange 18 has a single bore 27 filled with a liquid and closed by a piston 28.

The annular member 10 has a flange 29 that takes the form of a ring whose axis is parallel to the axis X of the launch vehicle. The ring is extended by two axially spaced radial annular rims, one of which ($29a$) has the nut and bolt fasteners 15 for fixing the device in accordance with the invention to the skirt 6 passed through it and the other of which ($29b$) has passed through it nut and bolt fasteners 31 for fastening it to plates 30 for loading the springs 25, 26 (in the vicinity of the spring thrust bearings $12_i$) and nut and bolt fasteners such as that referenced 31' for fastening it to stop plates 32 for the pistons 28 (in line with the hydraulic thrust bearings $13_j$).

FIG. 3A shows that there is clearance between the flange 18 and the annular rim $29a$, on the one hand, and between the flange 18 and the plate 30, on the other hand. It is clear that in this configuration the skirt 6 and the satellite 4 are supported by the springs 25, 26 of the spring thrust bearings $12_i$. The flexibility of the suspension is then a function of the stiffness of the springs.

FIG. 3B shows the flange 18 abutted against the rim $29a$ of the flange 29. If these flanges are immobilized in this position, the springs clearly have no effect on the suspension of the skirt 6 and the satellite 4, which is then very stiff.

FIG. 4 shows the flange 18 abutted against the rim $29a$ of the flange 29. If these flanges are immobilized in this position, the springs clearly have no effect on the suspension of the skirt 6 and the satellite 4, which is then very stiff.

According to the invention, the change from the "soft" suspension shown in FIG. 3A to the "stiff" suspension shown in FIG. 3B is effected by appropriately controlling the pressure of the incompressible liquid filling the chambers 27 of the hydraulic thrust bearings 13$_j$.

FIG. 4 of the accompanying drawings shows that as the pressure is increased in the chamber 27 of the hydraulic thrust bearing shown the piston 28 is moved away from the bottom of the chamber 27, which moves the flange 18 into contact with the flange 29 (see FIG. 3B).

This establishes a firm connection between the two annular members 10 and 11, which are then coupled mechanically. The satellite is then rigidly coupled to the launch vehicle.

On reducing the pressure in the chamber 27 of the hydraulic thrust bearing 12$_i$, the piston 28 is moved toward the bottom of the chamber 27, breaking the rigid mechanical coupling previously established between the annular members 10, 11. The satellite and the skirt are then carried by the springs 25, 26 of the spring thrust bearings and are flexibly supported on the launch vehicle (see FIG. 3A).

As stated above, in some phases of the flight of the launch vehicle shock and vibration can be transmitted from the launch vehicle to the satellite, with the risk of damaging the satellite. Shock and vibration occur in particular on separation of certain components of the launch vehicle. This applies in particular when jettisoning the nose-cap 7 and, later, the first stage of the launch vehicle, which releases the upper stage 5 carrying the satellite. Jettisoning the nose-cap and the first stage of the launch vehicle are identified in the FIG. 6 graph, which represents variations in the acceleration of the launch vehicle during successive separation of the boosters (branch A), the first stage 1 (branch B) and the upper stage 5 (branch C). The nose-cap separates at d, during separation of the first stage, and the first stage is jettisoned at e in branch C, where there is substantially zero acceleration.

Shock and vibration must be damped and filtered to protect the satellite. This is the function of the spring thrust bearings 12$_i$ of the device in accordance with the invention (see FIGS. 3A and 3B). When these thrust bearings are activated, their springs impart to the coupling of the annular members 10 and 11 a stiffness of the order of $10^{-7}$ N/m, for example, very much lower than that established by establishing the high pressure in the hydraulic thrust bearings 13$_j$, the effect of which is to filter shock.

In accordance with the invention, to activate these thrust bearings, the pressure of the fluid in the thrust bearings 13$_j$ is reduced so that the satellite 4 and the skirt 6 then rest on the axial spring thrust bearings 12$_i$ (see FIG. 3A). Those thrust bearings are then able to damp the shock and vibration referred to above.

FIG. 7 is a graph of typical variations in the pressure in the hydraulic thrust bearings during the phases of the flight of the launch vehicle shown in FIG. 6. At the times of separations (at d and e), the pressure is suddenly reduced from 70 bars to zero, for example, and then rapidly re-established once separation is complete.

FIG. 5 is a diagram of a control circuit for controlling the pressure. The circuit essentially includes a cylinder 40 containing a mobile piston 41 whose displacement controls the pressure of the fluid, which is advantageously an incompressible liquid filling the line 42 and the hydraulic thrust bearings 13$_j$ at equal pressure. One chamber of the cylinder 40 is connected to the line 42 via a valve 43. The other chamber of the cylinder is connected to a drain valve 44. A line 45 equipped with a check valve 46 is used on the ground to fill the thrust bearings 13$_j$ and the chamber of the cylinder 40 which communicates with those thrust bearings with a liquid at a high pressure, for example approximately 70 bars. The valve 44 is then closed to isolate the other chamber of the cylinder, filled with gas under pressure. During normal phases of the flight, it is the pressure of the liquid that imparts to the suspension device according to the invention the required stiffness, after the valve 43 is closed.

At the beginning of a separation phase, the pressure is suddenly reduced by simultaneously opening the valve 43 and the valve 44 for draining the chamber of the cylinder that is filled with pressurized gas. The gas flows out until the pressure in this chamber falls to the required value, for example of the order of 0 to 25 bars. The piston 41 has then moved to the left, as seen in the drawing, as far as the position 41a. This sudden expansion of the volume available to the pressurized liquid in the line 42 and the hydraulic thrust bearings 13$_j$ causes the pressure of the liquid to fall and reduces the pressure applied to the hydraulic thrust bearings, which then falls to a value in the range from 0 to approximately 25 bars, for example, to activate the spring thrust bearings 12$_i$ in parallel with the hydraulic thrust bearings 13$_j$.

When the separation phase is completed, a high gas pressure (approximately 70 bars) is re-established in the cylinder 20 by recharging it with pressurized gas from a reservoir 47 (after phase d) or a reservoir 48 (after phase e). The reservoirs can conveniently consist of controlled-ignition pyrotechnic detonators.

It is now apparent that the invention achieves the stated object, namely to provide a device for suspending a payload in a launch vehicle adapted to protect the payload from shock or vibration during the various phases of flight by appropriate adaptation of the stiffness of the suspension, the device being of simple construction, reliable and flexible in operation. In this regard, note that all the thrust bearings are integrated into the same annular flange 18, enabling the chambers in which the thrust bearings are accommodated to be manufactured by conventional numerically controlled machine tools. The hydraulic thrust bearings are of conventional construction, with O-ring seals, a fully mature technology that ensures that the device is reliable, as is essential in a spacecraft.

Nor does the device according to the invention suffer from the problem referred to in the preamble of this description relating to excessive stiffening of the shell of a flexible wall annular chamber when the pressure in the shell is high.

Of course, the invention is not limited to the embodiment described and shown, which is provided by way of example only. Thus the elastic and hydraulic thrust bearings could be inclined to the longitudinal axis of the launch vehicle to absorb shock propagating in the radial direction as well as in the axial direction.

The "on/off" control of the axial spring thrust bearings described above could be replaced by progressive control combining variable fractions of the flexibility developed by the springs and the stiffness established by the hydraulic thrust bearings.

Each of the spring thrust bearings 12$_i$ could include only one spring placed in a single bore, in the manner of the single piston of the hydraulic thrust bearings 13$_j$, which could include two bores in a head-to-tail arrangement, like the bores in the spring thrust bearings 12$_i$.

The invention being thus described, it will be apparent that the same may be varied in many ways. Such variations are not to be regarded as a departure from the spirit and scope of the invention, and all such modifications as would be recognized by one skilled in the art are intended to be included within the scope of the following claims.

What is claimed is:

1. A device for suspending a payload in a launch vehicle for launching said payload into space, the device comprising elastic force-absorbing elements including a plurality of spring thrust bearings installed between first and second rigid annular members concentric with a longitudinal axis of the launch vehicle and respectively fastened to said payload and said launch vehicle, and control means for controlling said elastic force-absorbing elements suitable for adapting the stiffness of the suspension device to various phases of the flight of the launch vehicle, said control means including a plurality of circumferentially-spaced hydraulic thrust bearings between said first and second rigid annular members, said hydraulic thrust bearings being mobile between a first position in which they couple said annular members rigidly and a second position in which said elastic force-absorbing elements are activated, said plurality of springs thrust bearings and said plurality of hydraulic thrust bearings being interleaved with each other.

2. The device according to claim 1, wherein said hydraulic thrust bearings are at equal pressure.

3. The device according to claim 2, wherein said control means include a circuit for feeding said hydraulic thrust bearings with liquid and said circuit includes a cylinder for selectively varying the pressure of said liquid between first and second values controlling the placing of the hydraulic thrust bearings in their first and second positions, respectively.

4. The device according to claim 3, further comprising means for setting the pressure of said liquid to said second value, which is less than said first value, during application of shock and/or impact to the device and adapted to activate the spring thrust bearings.

5. The device according to claim 4, wherein to change said pressure to said second value, said control means trigger a pressure drop in the liquid in said hydraulic thrust bearings.

6. The device according to claim 5, further comprising means for reestablishing the pressure of the liquid to said first value at the end of phases of flight subject to shock and/or vibration.

7. The device according to claim 6, wherein said means for reestablishing said pressure are pyrotechnic detonators.

8. The device according to claim 1, wherein said spring thrust bearings and hydraulic thrust bearings are all mounted on the same annular member.

9. The device according to claim 4, wherein said hydraulic thrust bearings press said spring thrust bearings against said first annular member when the liquid in them is at said first pressure.

10. The device according to claim 1, wherein said spring thrust bearings each include two head-to-tail bores containing oppositely acting springs disposed between two facing annular surfaces of said first annular member.

11. The device according to claim 1, wherein said elastic force-absorbing elements and said hydraulic thrust bearings are integrated into a skirt for supporting said payload on said launch vehicle.

12. A device for suspending a payload in a launch vehicle for launching said payload into space, the device comprising:

a first rigid annular member coupled to a second rigid annular member;

a plurality of circumferentially-spaced spring thrust bearings installed between said first and second annular members concentric with a longitudinal axis of the launch vehicle and respectively fastened to said payload and said launch vehicle; and a plurality of circumferentially-spaced hydraulic thrust bearings between said first and second annular members for activating and deactivating said plurality of spring thrust bearings to alter the stiffness of the suspension device, said hydraulic thrust bearings interleaved with said spring thrust bearings and having a first position in which said spring thrust bearings are deactivated and said first and second annular members are rigidly coupled, and a second position in which said spring thrust bearings are activated to reduce a stiffness of said coupling between said first and second annular members.

13. The device according to claim 12, further comprising a circuit for feeding said hydraulic thrust bearings with liquid and including a cylinder for selectively varying a pressure of said liquid between first and second pressure values controlling the placing of the hydraulic thrust bearings in said first and second positions, respectively.

14. The device according to claim 12, wherein said spring thrust bearings and hydraulic thrust bearings are all mounted on the same annular member.

15. The device according to claim 12, wherein said spring thrust bearings each include two head-to-tail bores containing oppositely acting springs disposed between two facing annular surfaces of said first annular member.

16. The device according to claim 12, wherein said spring thrust bearings and said hydraulic thrust bearings are integrated into a skirt for supporting said payload on said launch vehicle.

17. The device according to claim 13, wherein said hydraulic thrust bearings in said first position press said spring thrust bearings against said first annular member.

18. The device according to claim 13, wherein said hydraulic thrust bearings in said second position allow clearance between a flange coupled to said second annular member and said first annular member for spring thrust bearing activation.

* * * * *